(12) United States Patent
Cunha et al.

(10) Patent No.: US 9,057,523 B2
(45) Date of Patent: Jun. 16, 2015

(54) MICROCIRCUIT COOLING FOR GAS TURBINE ENGINE COMBUSTOR

(75) Inventors: Frank J. Cunha, Avon, CT (US); Timothy S. Snyder, Glastonbury, CT (US)

(73) Assignee: United Technologies Corporation, Hartford, CT (US)

(*) Notice: Subject to any disclaimer, the term of this patent is extended or adjusted under 35 U.S.C. 154(b) by 941 days.

(21) Appl. No.: 13/193,696

(22) Filed: Jul. 29, 2011

(65) Prior Publication Data

US 2013/0025288 A1   Jan. 31, 2013

(51) Int. Cl.
| | |
|---|---|
| *F23R 3/12* | (2006.01) |
| *F02C 7/12* | (2006.01) |
| *F23R 3/00* | (2006.01) |
| *F23R 3/06* | (2006.01) |
| *F23R 3/14* | (2006.01) |

(52) U.S. Cl.
CPC . F23R 3/002 (2013.01); F23R 3/12 (2013.01); F02C 7/12 (2013.01); F23R 3/06 (2013.01); F23R 3/14 (2013.01); *F23R 2900/03041* (2013.01); *F23R 2900/03042* (2013.01); *F23R 2900/03043* (2013.01); *F23R 2900/03044* (2013.01)

(58) Field of Classification Search
CPC ............. F23R 3/002; F23R 3/16; F23R 3/06; F23R 3/12; F23R 3/04; F23R 2900/03041–2900/03043; F02C 7/24; F02C 7/12; F05D 2240/15; F05D 2260/204
USPC .................................................. 60/752–760
See application file for complete search history.

(56) References Cited

U.S. PATENT DOCUMENTS

| | | | |
|---|---|---|---|
| 4,695,247 A * | 9/1987 | Enzaki et al. ................. | 431/352 |
| 4,784,600 A | 11/1988 | Moreno | |
| 5,490,380 A * | 2/1996 | Marshall ........................ | 60/776 |
| 6,241,468 B1 | 6/2001 | Lock et al. | |
| 6,606,861 B2 * | 8/2003 | Snyder ........................... | 60/752 |
| 6,668,906 B2 | 12/2003 | Burd | |
| 6,705,831 B2 | 3/2004 | Draper | |
| 6,913,064 B2 | 7/2005 | Beals et al. | |
| 7,137,776 B2 | 11/2006 | Draper et al. | |
| 7,174,945 B2 | 2/2007 | Beals et al. | |
| 7,303,375 B2 | 12/2007 | Cunha et al. | |
| 7,306,024 B2 | 12/2007 | Beals et al. | |
| 7,575,039 B2 | 8/2009 | Beals et al. | |
| 7,665,307 B2 | 2/2010 | Burd et al. | |
| 7,681,398 B2 | 3/2010 | Patel et al. | |
| 7,721,548 B2 | 5/2010 | Patel et al. | |
| 7,722,325 B2 | 5/2010 | Cunha | |
| 7,731,481 B2 | 6/2010 | Cunha et al. | |
| 7,748,221 B2 | 7/2010 | Patel et al. | |
| 7,770,397 B2 | 8/2010 | Patel et al. | |
| 7,775,768 B2 | 8/2010 | Devore et al. | |
| 7,827,800 B2 | 11/2010 | Stastny et al. | |
| 7,845,174 B2 | 12/2010 | Parkman et al. | |
| 7,861,530 B2 | 1/2011 | Hawie et al. | |
| 7,886,540 B2 | 2/2011 | Webb | |
| 7,926,280 B2 | 4/2011 | Morenko et al. | |
| 7,934,382 B2 | 5/2011 | Burd | |
| 7,942,188 B2 | 5/2011 | Skelley, Jr. et al. | |
| 7,954,325 B2 | 6/2011 | Burd et al. | |
| 2003/0213250 A1 * | 11/2003 | Pacheco-Tougas et al. .... | 60/752 |

* cited by examiner

*Primary Examiner* — Andrew Nguyen
(74) *Attorney, Agent, or Firm* — Carlson, Gaskey & Olds, P.C.

(57) ABSTRACT

A combustor component of a gas turbine engine including a heat shield panel. The heat shield panel a defines microcircuit flow path within a thickness of said heat shield panel.

9 Claims, 10 Drawing Sheets

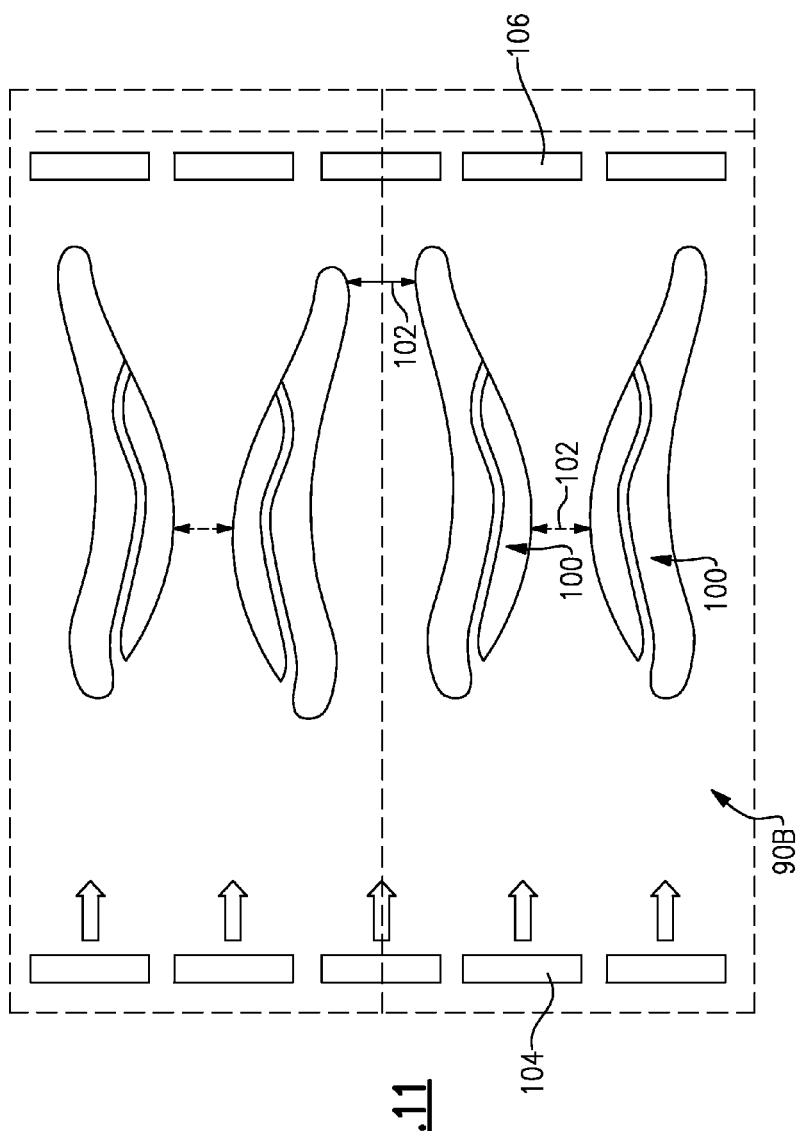
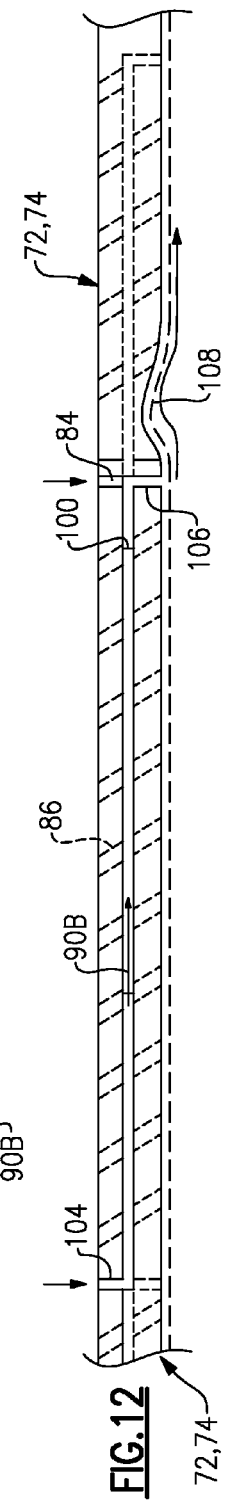
FIG.11
FIG.12

MICROCIRCUIT COOLING FOR GAS TURBINE ENGINE COMBUSTOR

BACKGROUND

The present disclosure relates to a combustor, and more particularly to a cooling arrangement therefor.

Gas turbine combustors have evolved to full hoop shells with attached heat shield combustor liner panels. The liner panels may have relatively low durability due to local hot spots that may cause high stress and cracking. Hot spots are conventionally combated with additional cooling air, however, this may have a potential negative effect on combustor emissions, pattern factor, and profile.

Current combustor field distresses indicate hot spots at junctions and lips. Hot spots may occur at front bulkhead panels and, in some instances, field distress propagates downstream towards the front liner panels. The distress may be accentuated in local regions where dedicated cooling is restricted due to space limitations. Hot spots may also appear in regions downstream of diffusion quench holes. In general, although effective, a typical combustor chamber environment includes large temperature gradients at different planes distributed axially throughout the combustor chamber.

SUMMARY

A combustor component of a gas turbine engine according to an exemplary aspect of the present disclosure includes a heat shield panel with a refractory metal core (RMC) microcircuit.

A method of cooling a combustor of a gas turbine engine according to an exemplary aspect of the present disclosure includes communicating a cooling flow through a refractory metal core (RMC) microcircuit.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 11 is a planar view of the micro-circuit of FIG. 6;

FIG. 12 is a sectional view of the micro-circuit of FIG. 6;

DETAILED DESCRIPTION

Figure 1:
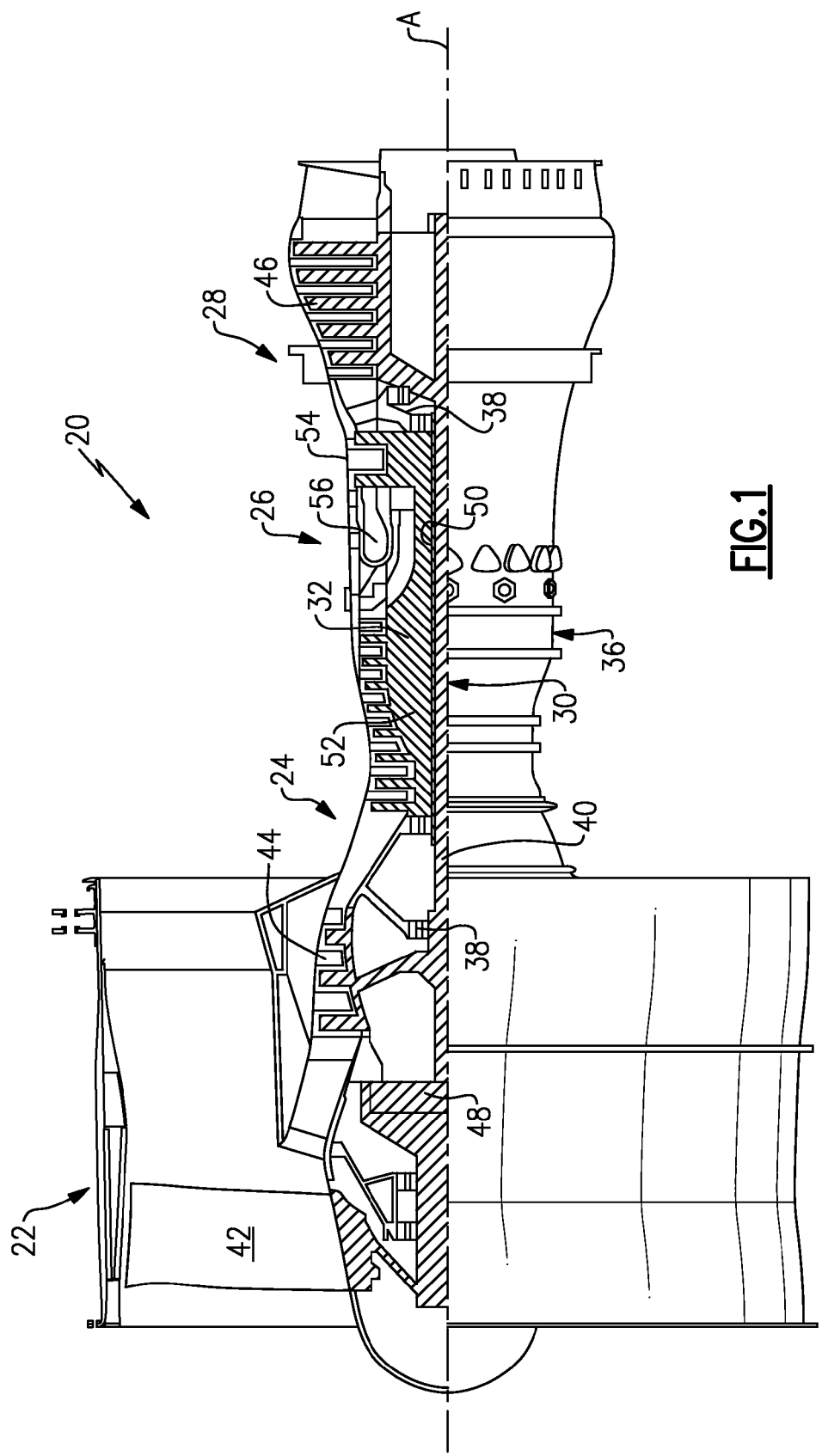
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel within the combustor 56, then expanded over the high pressure turbine 54 and low pressure turbine 46. The turbines 46, 54 rotationally drive the respective low speed spool 30 and high speed spool 32 in response to the expansion.

Figure 2:
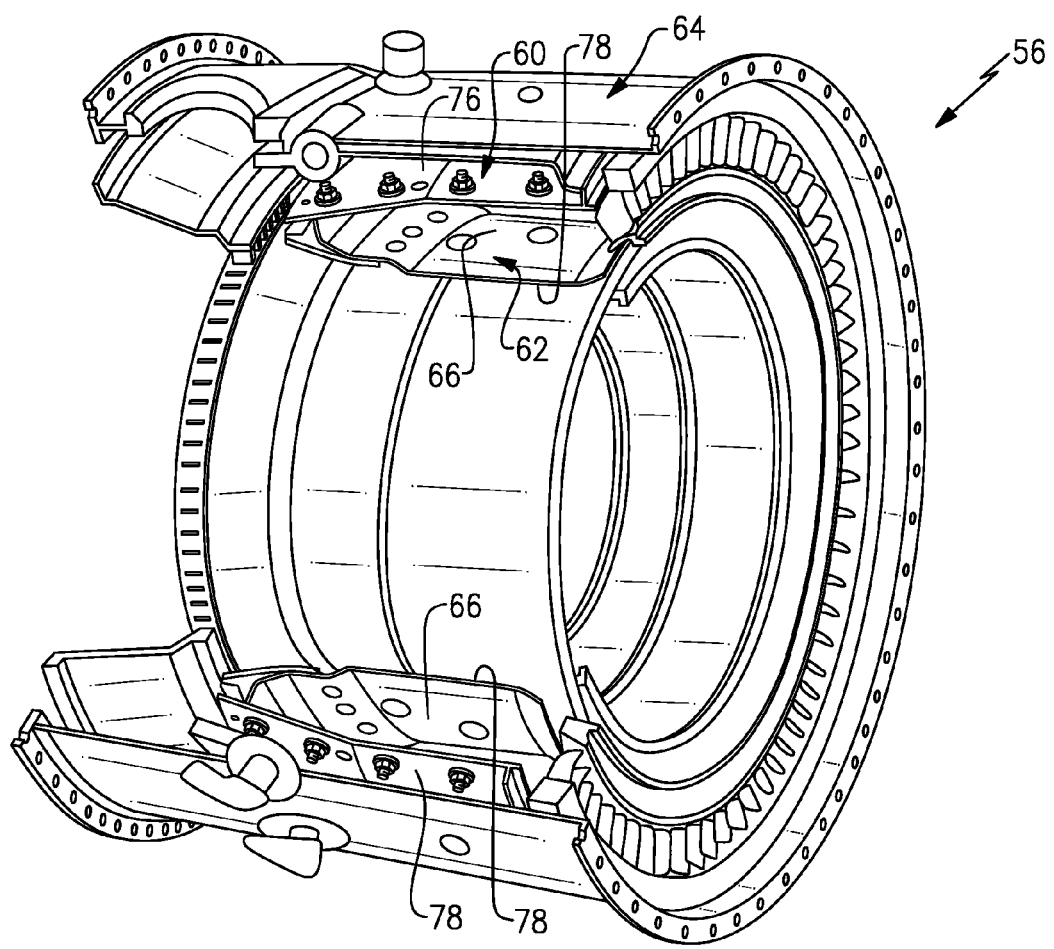
FIG. 2 is a perspective partial sectional view of an exemplary annular combustor that may be used with the gas turbine engine shown in FIG. 1.

With reference to FIG. 2, the combustor 56 generally includes an outer combustor liner 60 and an inner combustor liner 62. The outer combustor liner 60 and inner combustor liner 62 are spaced inward from a combustor case 64 such that a combustion chamber 66 is defined between combustor liners 60, 62. The combustion chamber 66 may be generally annular in shape.

The outer combustor liner 60 and the combustor case 64 define an outer annular passageway 76 and the inner combustor liner 62 and the combustor case 64 define an inner annular passageway 78. It should be understood that although a particular combustor is illustrated, other combustor types with various combustor liner panel arrangements will also benefit herefrom. It should be further understood that the cooling flow paths are but an illustrated embodiment and should not be limited only thereto.

Figure 3:
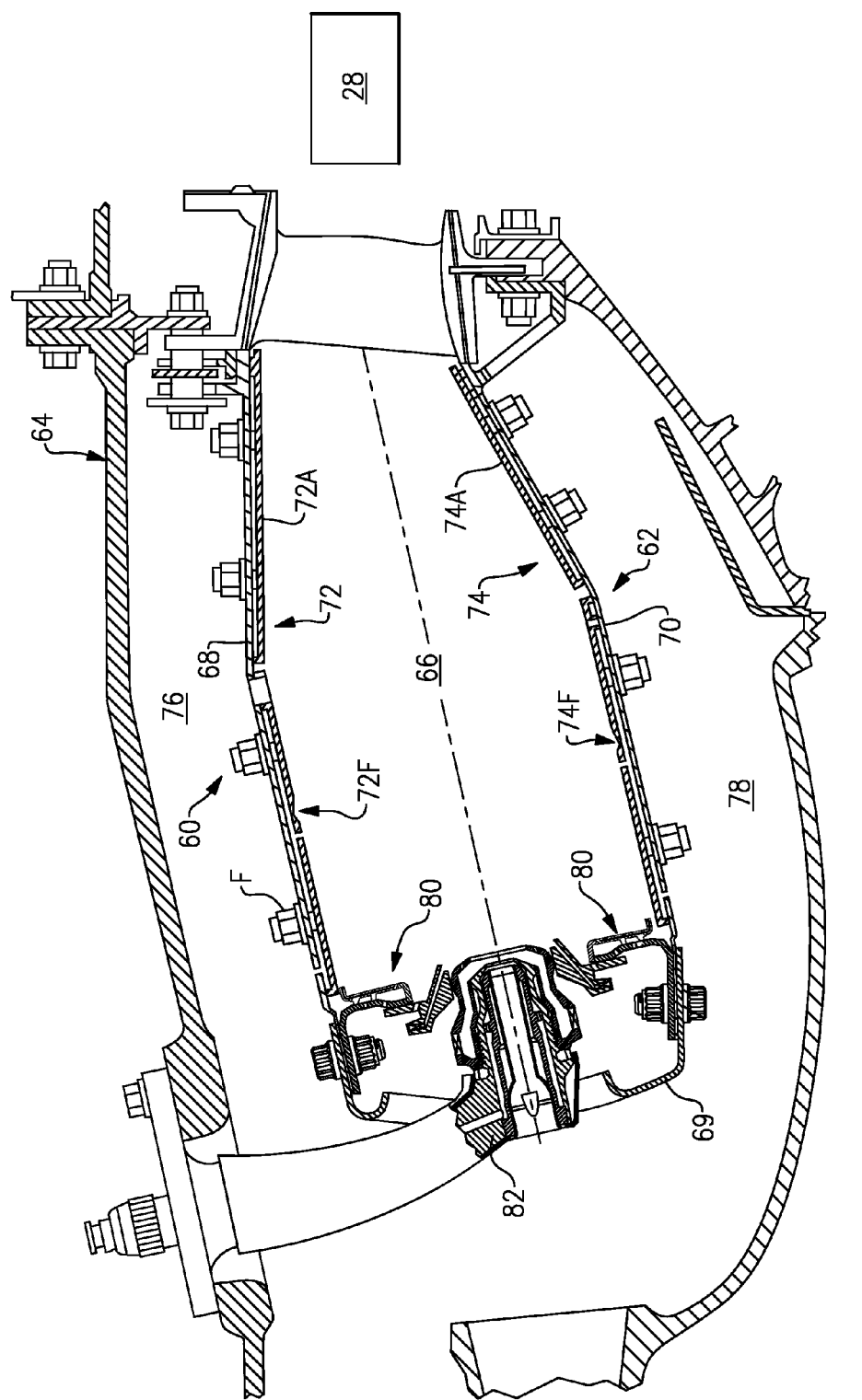
FIG. 3 is a cross-sectional view of an exemplary combustor that may be used with the gas turbine engine.

With reference to FIG. 3, the combustor liners 60, 62 contain and direct the combustion products to the turbine section 28. Each combustor liner 60, 62 generally includes a support shell 68, 70 which supports one or more respective heat shield panels 72, 74 mounted to a hot side of the respective shell 68, 70. The heat shield panels 72, 74 define a heat shield panel array which may be associated with each fuel injector 82.

In the disclosed non-limiting embodiment, the heat shield panel array includes forward heat shield panels 72F and aft heat shield panels 72A that line the hot side of the outer shell 68 and forward heat shield panels 74F and aft heat shield panels 74A that line the hot side of the inner support shell 70. Fastener assemblies F such as studs and nuts may be used to connect each of the heat shield panels 72, 74 to the respective outer and inner support shells 68, 70 to provide a floatwall type array. Each of the heat shield panels 72A, 72F, 74A, 74F may be generally rectilinear and manufactured of, for example, a nickel based super alloy or ceramic material. It should be understood that various numbers, types, and array arrangements of heat shield panels may alternatively or additionally be provided.

The heat shield panel array may also include a heat shield bulkhead panel 80 that is radially arranged and generally transverse to the heat shield panels 72, 74. Each bulkhead panel 80 surrounds the fuel injector 82 which is mounted within a dome 69 to connect the respective outer and inner support shells 68, 70. Each bulkhead panel 80 may define a bend to provide a transition toward the forward heat shield panels 72F, 74F.

Figure 4:
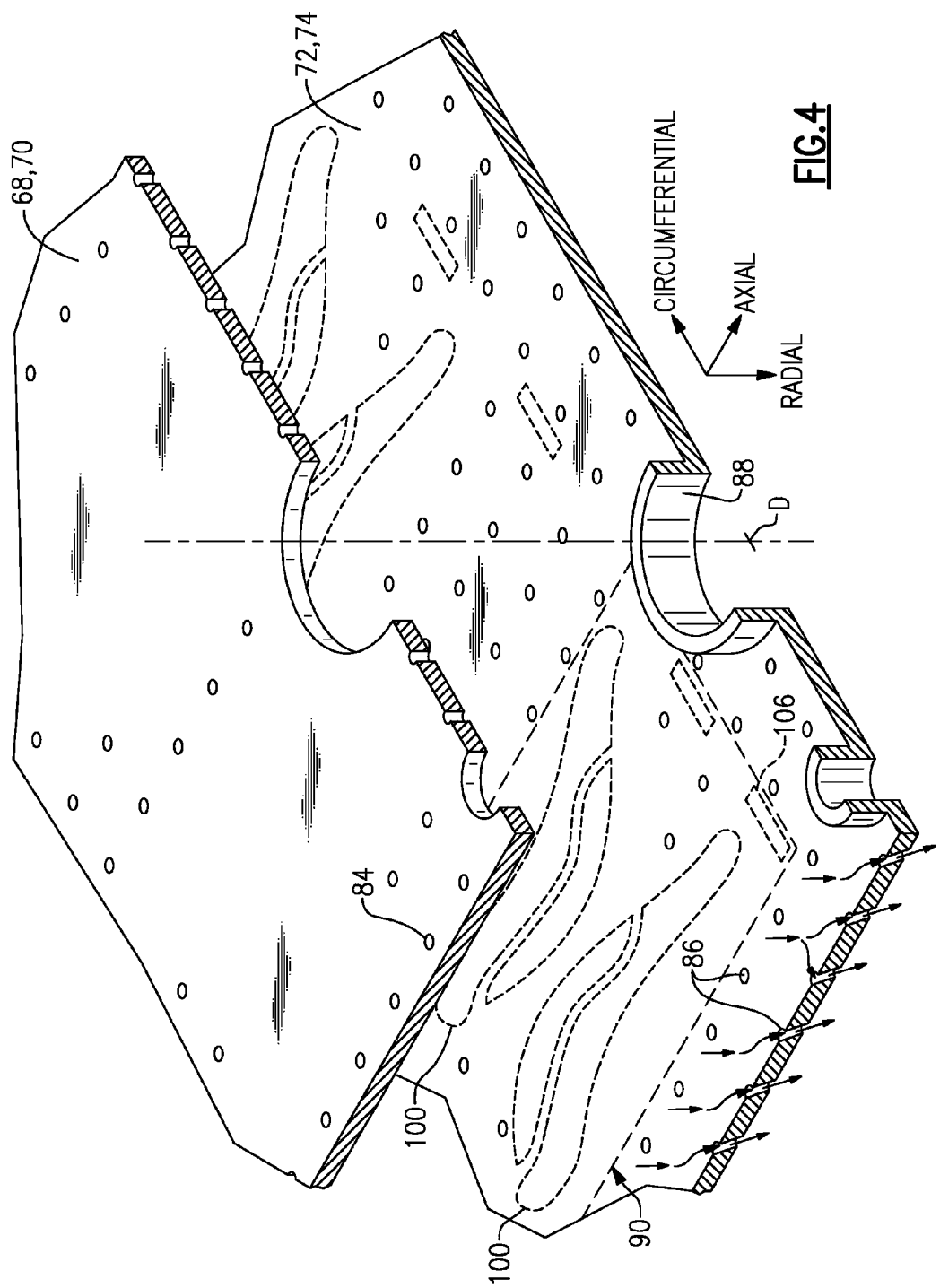
FIG. 4 is a cross-sectional view of the exemplary combustor of FIG. 3 illustrating a multiple of flows therein.

With reference to FIG. 4, a cooling arrangement disclosed herein generally includes cooling holes 84, film cooling holes 86, dilution holes 88 and refractory metal core (RMC) microcircuits 90 which receive secondary cooling air from passageways 76, 78 (shown in FIG. 3). The impingement cooling holes 84 penetrate through the outer and inner support shells 68, 70 to communicate the secondary cooling air, into the space between the inner and outer support shells 68, 70 and the respective heat shield panels 72, 74 to provide backside cooling thereof. The film cooling holes 86 penetrate through each of the heat shield panels 72, 74 to promote the formation of a film of cooling air for effusion cooling. Each dilution hole 88 penetrates both the inner and outer support shells 68, 70 and the respective heat shield panels 72, 74 along a common dilution hole axis D to inject dilution air which facilitates combustion to release additional energy from the fuel.

The RMC microcircuits 90 may be selectively formed within the heat shield panels 72, 74 and the bulkhead panels 80 through a refractory metal core process. Refractory metal cores (RMCs) are typically metal based casting cores usually composed of molybdenum with a protective coating. The refractory metal provides more ductility than conventional ceramic core materials while the coating—usually ceramic—protects the refractory metal from oxidation during a shell fire step of the investment casting process and prevents dissolution of the core from molten metal.

Figure 5:
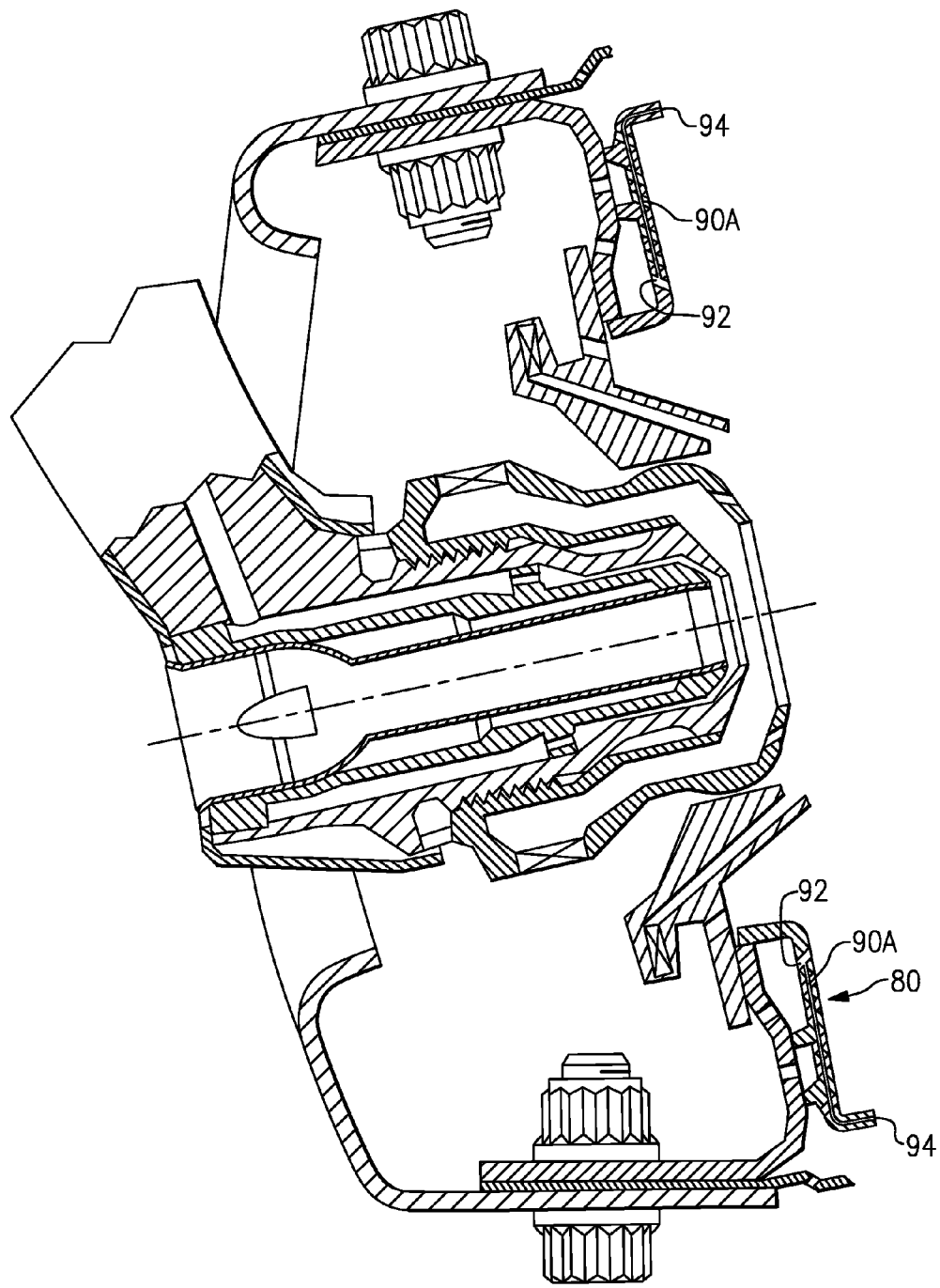
FIG. 5 is an expanded cross-sectional view of a bulkhead heat shield panel of the exemplary combustor.
Figure 6:
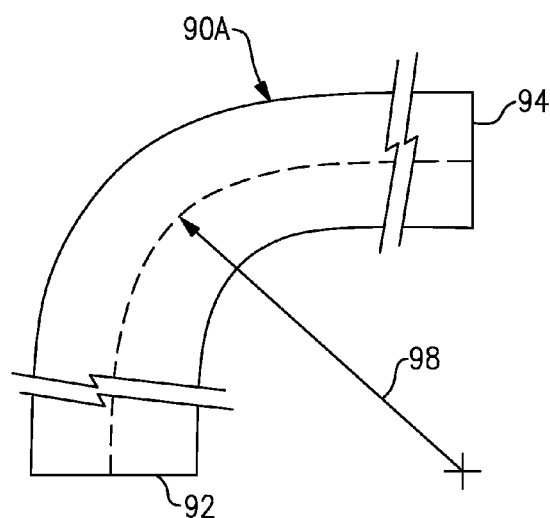
FIG. 6 is an expanded cross-sectional view of a micro-circuit within the bulkhead heat shield panel.
Figure 7:
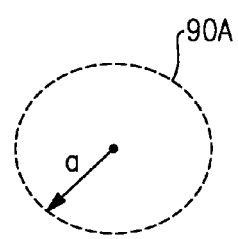
FIG. 7 is an expanded transverse cross-sectional view of the micro-circuit of FIG. 6.

With reference to FIG. 5, the cooling arrangement disclosed in the illustrated non-limiting embodiment locates RMC microcircuits 90A within the bulkhead panels 80. Split lines from RMC tabs formed in the RMC process may be used to define one or more inlets 92 and/or exits 94 (FIG. 6). Although the RMC microcircuit 90A is illustrated as generally circular in cross-section (FIG. 7), it should be understood that various profile cross-sections may alternatively or additionally be provided.

Figure 8:
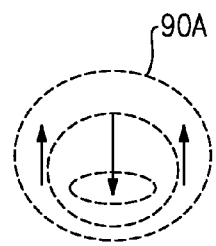
FIG. 8 is an expanded transverse cross-sectional view of the micro-circuit of FIG. 6 illustrating an in-plane velocity profile.
Figure 9:
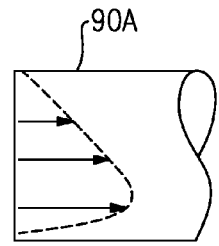
FIG. 9 is an expanded cross-sectional view of the micro-circuit of FIG. 6 illustrating a main velocity profile.

A bend 98 is defined within each RMC microcircuit 90A within the bulkhead panel 80 such that the Dean's effect becomes a driving force to establish in-plane re-circulating flows (FIG. 8) which facilitate enhanced internal cooling of the bulkhead panels 80 as the cooling flow is essentially biased toward the hot side thereof (FIG. 9).

Figure 10:
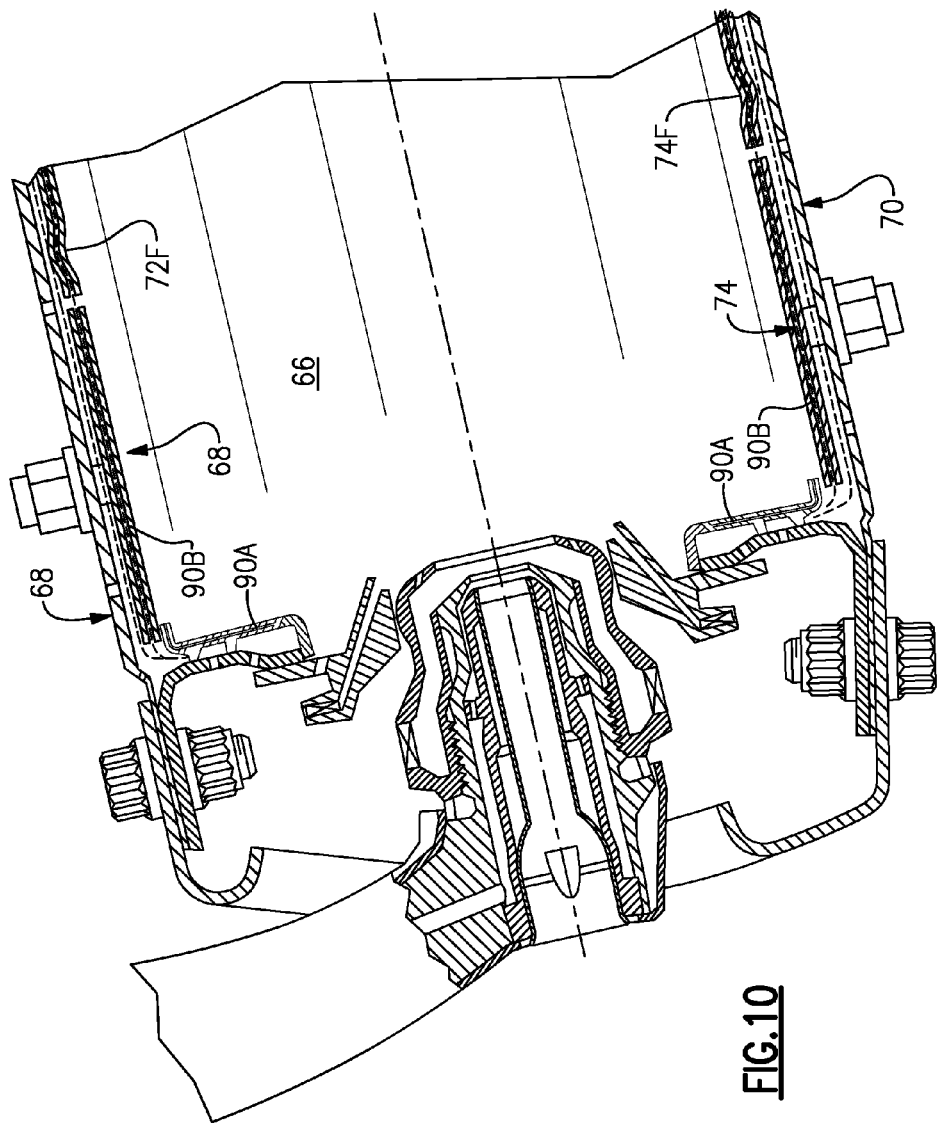
FIG. 10 is an expanded cross-sectional view of a front heat shield panel of the exemplary combustor.

With reference to FIG. 10, the cooling arrangement may continue through RMC microcircuits 90B located within the forward panels 72F, 74F. Each RMC microcircuit 90B within the forward panels 72F, 74F include a multiple of internal features 100 positioned in a flow path of the microcircuits 90B (FIG. 11) and which may be repeated tangentially and axially throughout the heat shield panels 72, 74.

With reference to FIG. 11, the internal features 100 are arranged as a pair of islands positioned in a flow path of the microcircuit 90B. The islands or internal features 100 define metering sections 102 which operate as flow restrictions to control secondary cooling air flow and optimize cooling efficiency between an inlet 104 and an exit 106. The metering sections 102 facilitate optimum convective efficiency as a measure of heat pick-up, as the higher heat pick-up leads to higher cooling efficiency. It should be understood that various shapes of internal features shaped other than the illustrated islands may alternatively or additionally be provided.

The inlets 104 and exits 106 may provide for film cooling, impingement cooling or combinations thereof. The exits 106 may alternate between film and impingement as required for management of the external thermal load. In one disclosed non-limiting embodiment, exits 106 are in communication with the microcircuit 90B and are arranged adjacent to film cooling holes 86 which penetrate through each of the heat shield panels 72, 74 to promote the formation of a film of cooling air for effusion cooling, and in another example are arranged adjacent to impingement cooling holes 84 (shown in FIG. 12). In addition, a wall depression 108 is located on a hot side of the heat shield panels 72, 74 downstream of each exit 106, 86 (FIG. 12) to facilitate film wall attachment through the Coanda effect. That is, the microcircuit 90B provides for effective convective efficiency supplemented alternatively by either impingement or film cooling with wall depressions 108 for film cooling protection.

Figure 13:
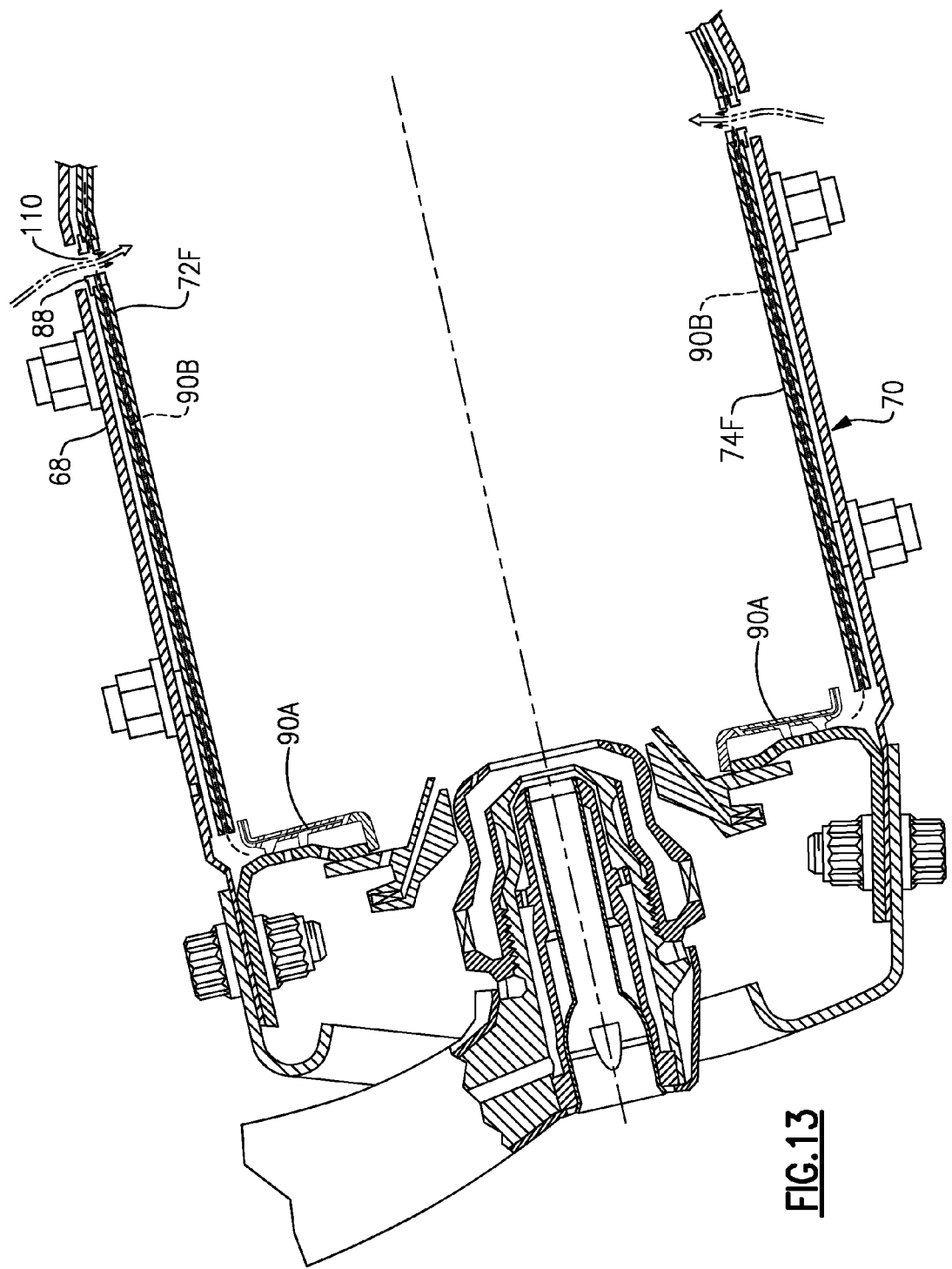
FIG. 13 is an expanded cross-sectional view of a dilution quench section of heat shield panel.
Figure 14:
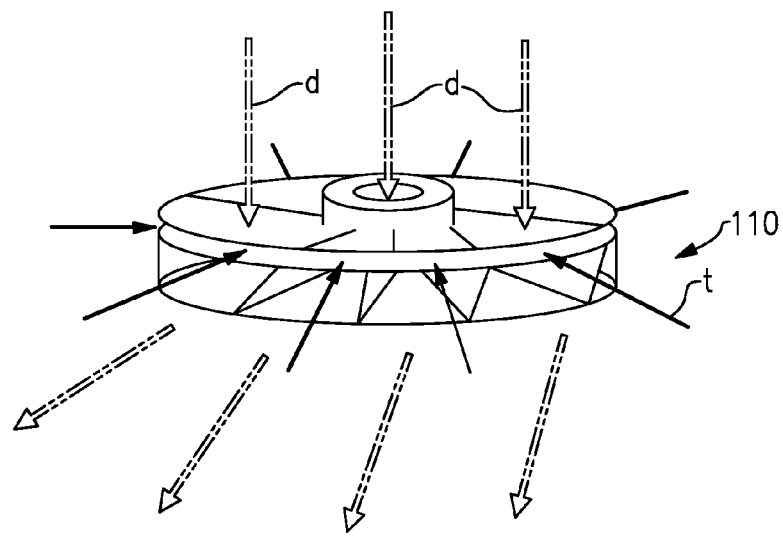
FIG. 14 is an expanded perspective view of a flow swirler located within a dilution hole.
Figure 15:
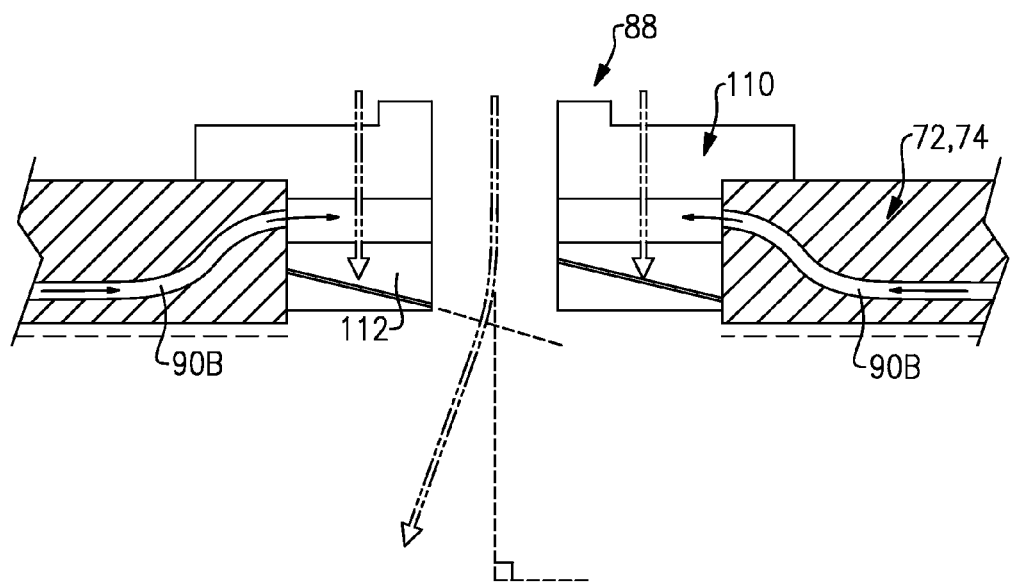
FIG. 15 is an expanded sectional view of the flow swirler.

With reference to FIG. 13, a flow swirler 110 is located within each dilution hole 88 to combine dilution flow with RMC microcircuit 90B to vector the dilution flow. In the disclosed non-limiting embodiment, the flow swirler 110 is located upstream of the combustor lean zone. The flow swirler 110 defines an axial flow path d for the dilution flow and a transverse flow path for receipt of the RMC microcircuit flow t (FIG. 14). Vanes 112 within the flow swirler 110 combine the flows d, t to vector the dilution flow d tangentially and accelerate the RMC microcircuit flow t (FIG. 15). The sink pressures for the RMC microcircuits are also lowered as a consequence of the high velocity flow swirler 110 to reduce cooling flux by approximately 40% over conventional levels.

The RMC microcircuits 90 provide effective cooling to address gas temperature variations inside the combustor chamber; enhance cooling through flow distribution with heat transfer enhancement features while maintaining increased film coverage and effectiveness throughout the combustor chamber; improve combustor durability by optimum distribution of cooling circuits; and facilitate lower emissions and improved turbine durability.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A combustor component of a gas turbine engine comprising:
   a heat shield panel defining a microcircuit flow path within a thickness of said heat shield panel and provided with an inlet and an outlet; and
   a flow swirler received in a dilution hole defined by said heat shield panel, said flow swirler downstream of and in communication with a microcircuit flow from said microcircuit flow path and with a diffusion flow from said dilution hole, wherein said diffusion flow is communicated from an annular passageway between a combustor case and said heat shield and wherein said flow swirler is configured to eject flow from said outlet in a tangential direction with respect to an axial flow path and to a combustion chamber defined by the heat shield panel.

2. The combustor component as recited in claim 1, wherein said heat shield panel is a forward heat shield panel.

3. The combustor component as recited in claim 1, further comprising a support shell, said heat shield panel mounted to said support shell, and said dilution hole defined along a common axis by said heat shield panel and said support shell.

4. The combustor component as recited in claim 3, wherein said support shell is mounted to said combustor case.

5. The combustor component as recited in claim 1, wherein said heat shield panel includes a multiple of internal features positioned in said microcircuit flow path.

6. The combustor component as recited in claim 5, wherein said multiple of internal features repeat tangentially and axially throughout said heat shield panel.

7. The combustor component as recited in claim 5, wherein said microcircuit flowpath includes said inlet and said outlet upstream of the flow swirler.

8. The combustor component as recited in claim 7, further comprising a wall depression located on a hot side of said heat shield panel downstream of said outlet and spaced from said microcircuit flowpath, said wall depression configured to provide firm wall attachment of flow communicated from said outlet onto said hot side.

9. The combustor component as recited in claim 5, wherein said multiple of internal features include a pair of islands arranged in said microcircuit flow path configured to meter flow through said microcircuit flow path.

* * * * *